United States Patent [19]

Nicholson

[11] 3,777,784
[45] Dec. 11, 1973

[54] FLUIDIC FEEDBACK SERVO VALVE
[75] Inventor: Robert D. Nicholson, Birmingham, Mich.
[73] Assignee: Koehring Company, Milwaukee, Wis.
[22] Filed: Dec. 6, 1971
[21] Appl. No.: 205,014

[52] U.S. Cl. .......................................... 137/625.62
[51] Int. Cl. ......................... F16k 11/07, F15b 5/00
[58] Field of Search............. 137/85, 625.62, 625.64

[56] References Cited
UNITED STATES PATENTS
3,543,648  12/1970  Stahle .......................... 137/625.62 X
FOREIGN PATENTS OR APPLICATIONS
730,965  6/1955  Great Britain ................. 137/625.62

Primary Examiner—Henry T. Klinksiek
Attorney—Dale R. Small et al.

[57] ABSTRACT

A fluidic feedback servo valve including a metering stage having a metering spool therein, a pilot stage including downstream opposed control nozzles therein for controlling the pressure at the opposite ends of the metering spool and an electromechanical transducer for varying the position of a target between the control nozzles, a pair of feedback nozzles positioned upstream of the ends of the metering spool in the pilot stage and conical feedback targets having different diameters on the opposite ends of the metering spool operably associated with the feedback nozzles for differentially varying orifices provided by the feedback nozzles in accordance with the axial position of the metering spool, the smaller diameter conical feedback target having a flat side and a transverse slot thereacross for receiving a locating pin, which pin is off-center with respect to the metering spool to prevent undesired rotation of the metering spool, and which pin when removed permits rotation of the metering spool to expose the flat side of the smaller diameter feedback target to the corresponding metering nozzle to permit withdrawal of the spool from the valve without disturbing the feedback nozzles.

7 Claims, 2 Drawing Figures

PATENTED DEC 11 1973

3,777,784

INVENTOR.
ROBERT D. NICHOLSON
BY Whittemore
Hulbert & Belknap
ATTORNEYS 3,777,784

FLUIDIC FEEDBACK SERVO VALVE

BACKGROUND OF THE INVENTION

1. Field of the Invention

The invention relates to electrohydraulic servo valves and refers more specifically to a fluidic feedback servo valve wherein conical feedback targets are provided on opposite ends of a valve metering member in conjunction with upstream pilot stage control nozzles, which feedback target and nozzles are cooperable to equalize the pressure on the opposite ends of the metering spool produced by a differential pressure across downstream control nozzles in accordance with the position of an electromechanical transducer responsive control target positioned therebetween whereby movement of the metering spool is an amplified replica of the movement of the control target in accordance with an input electrical signal to the servo valve.

2. Description of the Prior Art

Electrohydraulic servo valves of the past have often included a metering stage including a metering spool extending therethrough for metering hydraulic fluid between hydraulic input and return passages and output passages in accordance with the position of the spool, and a pilot stage including opposed downstream control nozzles having orifices therein, the differential pressure across which has been controlled by the position of a control target movable in accordance with an electrical control signal fed to an electromechanical transducer. With such prior structures the movement of the metering spool has often been limited to the movement of the target, whereby rapid metering of large quantities of hydraulic fluid through the metering stage of prior electrohydraulic servo valves has been difficult. Wherein prior servo valves have provided an amplified movement of a metering member in accordance with the movement of a control nozzle, the structure for permitting such amplified movement has been relatively complicated and/or difficult to produce and therefore expensive and/or inefficient in use.

SUMMARY OF THE INVENTION

In accordance with the present invention there is provided an electrohydraulic servo valve including a metering stage for metering hydraulic fluid therethrough in accordance with the position of a metering spool and a pilot stage for controlling the position of the metering spool in accordance with an electrical input signal to an electromechanical transducer. The movement of the metering spool is amplified with respect to the movement of the control target by the provision of conical feedback targets on the ends of the metering spool and a pair of feedback nozzles in the pilot section upstream with respect to the spool operable in conjunction with the feedback nozzles. Further, the metering spool having the conical feedback targets on the ends thereof is so constructed as to be removable from the metering stage of the valve without disturbing the feedback nozzles and the metering spool is prevented from rotation during use by pin and slot construction operable between the valve body and metering spool.

In addition, the control provided by the usual control nozzles and control target is assured in accordance with the present invention by the provision of a control chamber into which the control nozzles empty which is connected to a hydraulic fluid return passage by a restricting orifice.

DESCRIPTION OF THE PREFERRED EMBODIMENT

Figure 1:
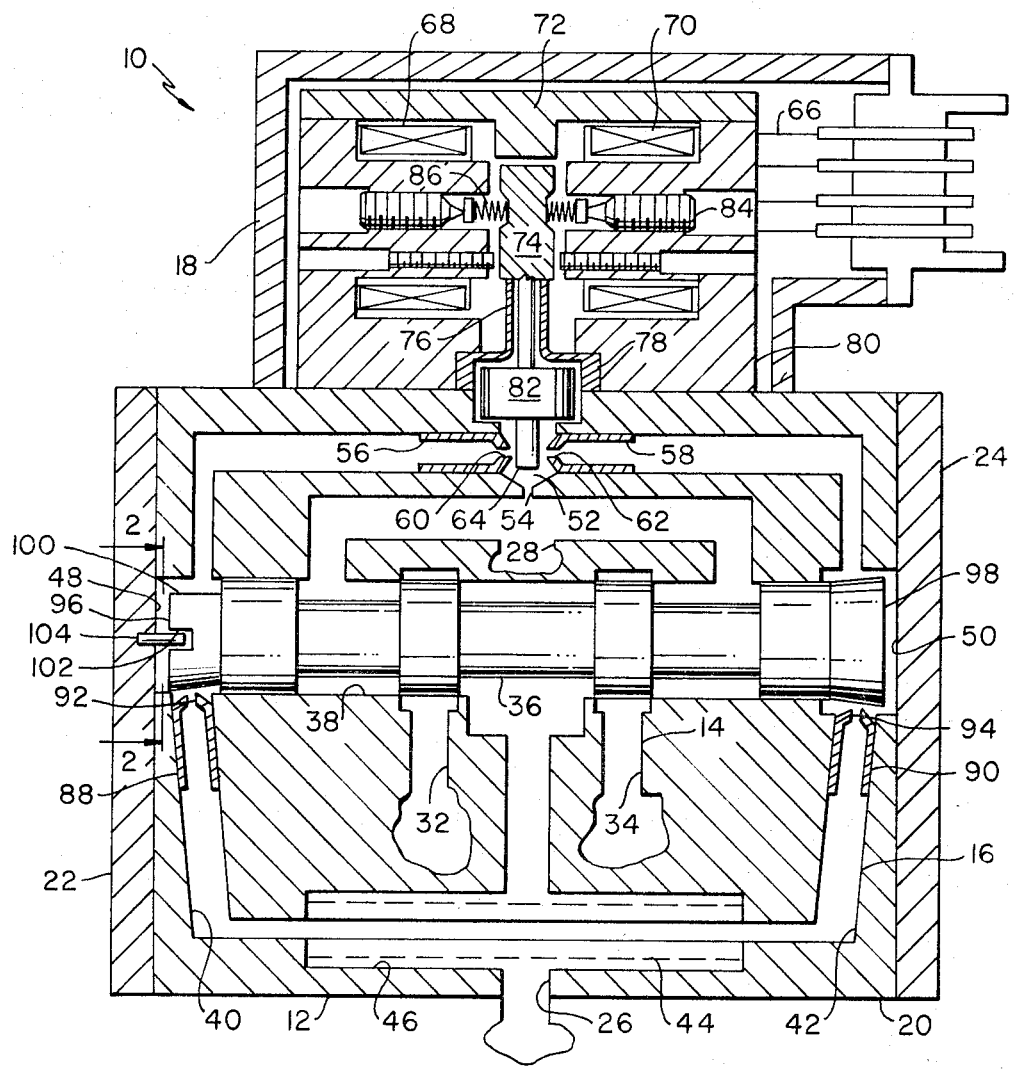
FIG. 1 is a diagrammatic section view of a fluidic feedback electrohydraulic servo valve constructed in accordance with the invention.
Figure 2:
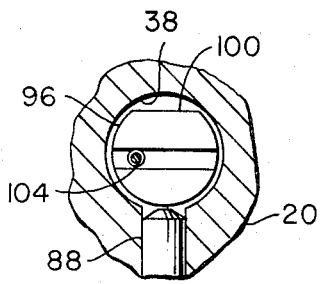
FIG. 2 is a partial cross section view of the servo valve illustrated in FIG. 1, taken substantially on line 2—2 in FIG. 1.

The fluidic feedback electrohydraulic servo valve 10 illustrated in FIG. 1 includes a valve part 12 having a metering stage 14 and a pilot stage 16. An electromechanical transducer or force motor 18 is secured to the valve 12 by convenient means such as bolts, not shown.

The valve 12 includes a body member 20. End caps 22 and 24 are secured to the opposite ends of the body member 20 by convenient means such as bolts, not shown.

A hydraulic fluid input passage 26 and a hydraulic fluid return passage 28 are provided in the valve body member 20, as shown. The valve body member 20 also includes the passages 32 and 34 therein which may be connected to a utilizing device such as the opposite ends of a hydraulic piston and cylinder structure, not shown, into and out of which hydraulic fluid from the passage 26 and into the passage 28 flows in accordance with the position of the metering spool 36 in the spool passage 38. The input passage 26, return passage 28, passages 32 and 34, the metering spool 36, and the metering spool passage 38 comprise the metering stage of the valve 12.

The pilot stage of the valve 12 includes the parallel hydraulic fluid passages 40 and 42 which pass hydraulic fluid from the hydraulic fluid input passage 26 through the inlet filter screen 44 in chamber 46 in body member 20 past the boost chambers 48 and 50 in passages 40 and 42 at the opposite ends of the metering spool 36 and into the control target chamber 52. Hydraulic fluid from the control target chamber 52 passes through the orifice 54 into the hydraulic fluid return passage 28.

As shown in FIG. 1, control nozzles 56 and 58 are provided downstream of the boost chambers 48 and 50, respectively, in the passages 40 and 42 and provide orifices 60 and 62, which orifices in conjunction with the control target 64 provide differential pressures in the boost chambers 48 and 50 in accordance with the position of the control target 64 between the nozzles 56 and 58. Differential pressure in the boost chambers 48 and 50 will cause the metering spool 36 to move to the right or to the left in FIG. 1 to meter fluid into and out of the passages 32 and 34 in accordance with the position of the control target 64.

The position of the control target 64 is determined by the electrical input signal to the electromechanical transducer 18 on the input conductors 66. The electrical input signals on the conductors 66 provide an electromagnetic signal in the coils 68 and 70, which in conjunction with the permanent magnet 72 produce a resultant electric field which operates on the end 74 of the control target 64 to pivot the control target 64 which is mounted on the flexure tube 76, as shown in FIG. 1, about the flexure tube 76. The flexure tube 76 is provided with a radially enlarged end 78 which fits in the body member 80 of the electromechanical transducer, as shown, to seal the hydraulic fluid in the valve and thus provide a dry force motor electromechanical transducer.

A dampening weight 82 is provided in conjunction with the control target 64 to prevent undue oscillation of the control target 64. In addition, as shown, center adjusting screws 84 and springs 86 are provided in the member 80 of the transducer 18 and act against the end 74 of the control target 64 to center the control target 64, as desired, in conjunction with the magnetic fields produced by the coils 68 and 70 and the permanent magnet 72, in accordance with known force motor electromechanical transducer structure.

In addition to the downstream control nozzles 56 and 58 in the passages 40 and 42, upstream feedback nozzles 88 and 90 including orifices 92 and 94, respectively, therein are provided in the pilot stage of the valve portion 12 of the electrohydraulic servo valve structure 10. The nozzles 88 and 90 empty into the boost chambers 48 and 50, as shown.

Conical feedback targets 96 and 98 are provided on the opposite ends of the metering spool 36, as shown. The conical target 98 is operable in conjunction with the nozzle 90 to vary the opening of the orifice 94 in accordance with the axial position of the spool 36. In this regard it will be noted that the nozzles 88 and 90 have a longitudinal axis which is perpendicular to the conical surface of the feedback targets 96 and 98 whereby axial movement of the metering spool 36 will cause movement of the conical surface of the targets toward or away from the orifices 92 and 94 by an amount proportional to the slope of the target surface. Thus, with the conical surfaces shown, axial movement of the spool 36 will produce a lesser movement of the conical surfaces 96 and 98 toward or away from the orifices 92 and 94. Thus, amplification of the movement of the control target 64 by the metering spool 36 is provided, as will be more obvious when the overall operation of the electrohydraulic servo valve is considered.

It will be noted that the conical target 98 is larger in diameter than the metering spool passage 38 and that the conical target 96 is smaller in diameter than the metering spool passage 38. Further, the conical target 96 is provided with a flat surface 100 thereon extending axially of the metering spool 36. With such structure, on rotation of the spindle 36 to place the flat surface 100 of the conical target 96 adjacent the orifice 92, the spindle 36 may be removed from the valve body 20 after removal of the cover plate 24 therefrom.

To prevent undesired rotation of the metering spool 36 during operation of the electrohydraulic servo valve 10, a slot 102 is provided extending diametrically across the outer end of the target 96 and a locating pin 104 is provided in the cover plate 22. The locating pin 104 is off-center with respect to the longitudinal axis of the metering spool 36 whereby rotation of the spindle 36 is prevented with the locating pin 104 within the slot 102.

Removal of the metering spool 36 therefore requires the removal of the locating pin 104, such as by removal of the cover plate 22, if the pin 104 is not designed to extend through the cover plate 22. Thus, removal of the metering spool 36 may be accomplished without varying the fixed positions of the feedback nozzles 88 and 90. Further, the metering spool 36 may be reinserted in the passage 38 with the correct orientation with regard to the nozzle 88 without difficulty.

In overall operation of the fluidic feedback electrohydraulic servo valve 10, with the valve 10 in an equilibrium position as illustrated in FIG. 1, with the metering spool 36 centered so that hydraulic fluid is not metered into or out of passages 32 and 34, the feedback targets 96 and 98 are equal distances from the orifices 92 and 94 and the control target 64 is an equal distance from the orifices 60 and 62, assume that an electrical signal is received by the electromagnetic transducer 18 to vary the position of the control target 64 to the right in FIG. 1.

Due to this change in position of the control target 64, the hydraulic pressure in the boost chamber 50 will rise and the pressure in the boost chamber 48 will be lowered, whereby the metering spool 36 will be caused to move to the left in FIG. 1 and hydraulic fluid under pressure from the passage 26 will be fed into the passage 32, while the passage 34 will be opened to the hydraulic fluid return passage 28. The movement of the metering spool 36 to the left will continue until the pressure in the boost chambers 48 and 50 are equalized.

To equalize the pressure in the boost chambers 48 and 50, it will be noted that on movement of the metering spool 36 to the left that the conical target 96 moves farther from the orifice 92 while the conical target 98 moves closer to the orifice 94. The hydraulic pressure in the chamber 50 will thus decrease, while the hydraulic pressure in the chamber 48 will increase until the pressure in the chambers are again equal at some new metering position of the spool 36.

If the control target moves half the distance between its original position and the orifice 62 to produce the original pressure differential in the boost chambers 48 and 50, the feedback target 98 must move halfway toward the orifice 94 to rebalance the pressure in the chambers 48 and 50 providing that the metering orifices 56 and 58 and the metering orifices 92 and 94 are symmetrical. Since the axial movement of the spindle is much greater than the movement of the target toward or away from the orifices 92 and 94 on axial movement of the spindle with the feedback nozzle and target disclosed, the movement of the control target 64 is greatly amplified in the axial movement of the metering spool 36, and in fact is amplified by the reciprocal of the slope of the feedback target surfaces.

The fluidic feedback hydraulic servo valve 10 as thus disclosed has particular advantages when compared with presently available commercial electrohydraulic servo valves in the simple structure thereof which requires fewer and less expensive parts. In addition, it will be noted that the input motion of applicant's electrohydraulic servo valve is completely divorced from the output motion so that more flexibility in the output device is permitted. Electromechanical transducers providing high torque and/or long stroke are thus not necessary because of the feedback arrangement provided in the servo valve 10.

Further, it will be noted that with the electrohydraulic servo valve 10 disclosed, all critical adjustments may be made independently of each other as by comparing flow characteristics of orifices to those of standard orifices. Any slight mismatches may be adjusted in the transducer, gain may be controlled by the permanent magnet, and the zero position of the valve may be adjusted. Thus, straight-forward valve setup procedures which eliminate much of the assembly time required by previously provided electrohydraulic servo valves may be used.

While one embodiment of the present invention has been considered in detail, it will be understood that other embodimenta snd modifications thereof are contemplated. It is, therefore, the intention to include all the modifications and embodiments of the invention as are defined by the appended claims within the scope of the invention.

What I claim as my invention is:

1. A fluidic feedback servo valve comprising a metering stage including a metering spool, a pilot stage including a pair of parallel hydraulic paths between a fluid inlet and a fluid outlet each of which includes an upstream and a downstream metering orifice, an electrohydraulic transducer for providing a differential impedance between the downstream orifices in accordance with an electrical signal applied thereto and means secured to the spool for providing a differential impedance between the upstream orifice which is a function of the position of the spool including conical targets on the ends of the spool which taper in opposite directions on the opposite ends of the spool, one of which conical targets is of smaller diameter than the metering spool and the other of which conical targets is of larger diameter than the metering spool whereby removal of the metering spool from the servo valve without movement of the upstream orifices is facilitated.

2. Structure as set forth in claim 1, and further including a flat side on the one conical target whereby on rotating the one conical target to position the flat side adjacent the associated upstream orifice the spool may be removed or replaced in the valve without disturbing the orifices in the valve.

3. Structure as set forth in claim 2, and further including a slot provided across one end of the spool and a locating pin carried by the valve extending within the slot off-center of the spool for preventing rotation of the spool in operation of the valve.

4. Structure as set forth in claim 1, wherein the downstream nozzles empty into a control chamber and the control chamber is connected by means of an orifice to the fluid outlet.

5. A fluidic feedback servo valve including a body having a metering spool passage extending therethrough, a hydraulic fluid input passage, a hydraulic fluid return passage and a pair of output passages in the body, a metering spool positioned in the spool passage in the body having metering lands thereon for metering fluid from the input passage into one of the output passages while simultaneously metering fluid from the other output passage to the return passage or preventing metering of fluid into or out of either of the output passages depending upon the position of the metering spool in the metering spool passage, and further comprising a pilot stage including a pair of parallel passages extending between the fluid input passage and fluid return passage, each including an upstream and a downstream nozzle therein which have metering orifices therein and boost chambers within the parallel passages between the nozzles receiving the opposite ends of the metering spool of the metering stage therein, an electromechanical transducer secured to the body of the valve and including a nozzle target positioned between the downstream nozzles and movable in opposite directions relative to the nozzles in accordance with an input electrical signal to the electromechanical transducer to provide a differential pressure across the orifices in the downstream nozzles and conical feedback targets secured to the opposite ends of the metering spool positioned with regard to the upstream nozzles so as to vary the pressure differential across the orifices provided by the upstream nozzles in accordance with the movement of the metering spool to provide an equilibrium pressure on the opposite ends of the spool on movement of the spool in response to the pressure differential across the downstream orifices resulting from movement of the control target whereby the movement of the metering spool is multiplied with respect to the movement of the control target, one of said feedback targets having a smaller diameter over the entire length thereof than the spool passage and includes a flat side thereon whereby on rotation of the metering spool to place the flat side over the upstream nozzle at the corresponding end of the metering spool the spool may be removed from the other end of the spool passage.

6. Structure as set forth in claim 5, and further including a slot across one end of the metering spool and a locating pin carried by the valve engageable with the slot off-center of the longitudinal axis of the metering spool to prevent rotation of the metering spool.

7. Structure as set forth in claim 6, wherein the downstream nozzles empty into a control chamber, and further including an orifice between the control chamber and the hydraulic fluid return passage.

* * * * *